US00RE45553E

(19) United States
(12) Reissued Patent
Marriott

(10) Patent Number: US RE45,553 E
(45) Date of Reissued Patent: Jun. 9, 2015

(54) MASS SPECTROMETER AND MASS FILTERS THEREFOR

(75) Inventor: Philip Marriott, Buxton (GB)

(73) Assignee: Thermo Fisher Scientific Inc., Franklin, MA (US)

(21) Appl. No.: 14/032,110

(22) Filed: Sep. 19, 2013

Related U.S. Patent Documents

Reissue of:

(64) Patent No.: 7,211,788
Issued: May 1, 2007
Appl. No.: 10/497,396
PCT Filed: May 13, 2003
PCT No.: PCT/GB03/02041
§ 371 (c)(1),
(2), (4) Date: Jan. 28, 2005
PCT Pub. No.: WO03/096376
PCT Pub. Date: Nov. 20, 2003

(30) Foreign Application Priority Data

May 13, 2002 (GB) ..... 0210930.4

(51) Int. Cl.
*H01J 49/06* (2006.01)

(52) U.S. Cl.
CPC ..... *H01J 49/063* (2013.01)

(58) Field of Classification Search
USPC ..... 250/281, 292, 282, 287, 296
See application file for complete search history.

(56) References Cited

U.S. PATENT DOCUMENTS 3,129,327 A 4/1964 Brubaker
3,937,955 A 2/1976 Comisarow et al.

(Continued)

FOREIGN PATENT DOCUMENTS

EP 0237259 A2 9/1887
EP 0373835 6/1990

(Continued)

OTHER PUBLICATIONS

Agilent Technologies Inc., Publication No. 5968-8813E, Dec. 1999, pp. 1-12.

(Continued)

*Primary Examiner* — Kiet T Nguyen
(74) *Attorney, Agent, or Firm* — Kilpatrick Towsend & Stockton LLP

(57) ABSTRACT

[A mass filter apparatus for filtering a beam of ions is described. The apparatus comprises an ion beam source and first and second mass filter stages in series to receive the ion beam. A vacuum system maintains the first and second filter stages at substantially the same operating pressure, below $10^{-3}$ torr. The first mass filter stage transmits only ions having a sub-range of mass-to-charge ratios including a selected mass-to-charge ratio. The second filter transmits only ions of the selected mass-to-charge ratio.]

[The second mass filter can achieve high accuracy detection without being subjected to problems such as build-up of material on quadrupole rods, resulting in a distorted electric field close to the rods. The first mass filter acts as a coarse filter, typically transmitting 1% of ions received from the ion source. Thus, the detection accuracy and lifetime of mass spectrometers embodying this invention are greatly improved.] *A mass filter apparatus for filtering a beam of ions is described. The apparatus comprises an ion beam source and first and second mass filter stages in series to receive the ion beam. A vacuum system maintains the first and second filter stages at substantially the same operating pressure, below $10^{-3}$ torr. The first mass filter stage transmits only ions having a sub-range of mass-to-charge ratios including a selected mass-to-charge ratio. The second filter transmits only ions of the selected mass-to-charge ratio. The second mass filter can achieve high accuracy detection without being subjected to problems such as build-up of material on quadrupole rods, resulting in a distorted electric field close to the rods. The first mass filter acts as a coarse filter, typically transmitting 1% of ions received from the ion source. Thus, the detection accuracy and lifetime of mass spectrometers embodying this invention are greatly improved.*

66 Claims, 2 Drawing Sheets

(56) References Cited

U.S. PATENT DOCUMENTS

| | | | | |
|---|---|---|---|---|
| 4,148,196 | A | 4/1979 | French et al. | |
| 4,234,791 | A | 11/1980 | Enke et al. | |
| 4,328,420 | A | 5/1982 | French | |
| 4,535,235 | A | 8/1985 | McIver, Jr. | |
| 4,542,293 | A | 9/1985 | Fenn et al. | |
| 4,746,794 | A | 5/1988 | French et al. | |
| 4,948,962 | A | 8/1990 | Mitsui et al. | |
| 4,963,736 | A | 10/1990 | Douglas et al. | |
| 5,043,575 | A * | 8/1991 | Habfast et al. | 250/283 |
| 5,049,739 | A | 9/1991 | Okamoto | |
| 5,134,286 | A | 7/1992 | Kelley | |
| 5,157,260 | A | 10/1992 | Mylchreest et al. | |
| 5,223,711 | A | 6/1993 | Sanderson et al. | |
| 5,352,892 | A | 10/1994 | Mordehai et al. | |
| 5,381,008 | A | 1/1995 | Tanner et al. | |
| 5,426,301 | A | 6/1995 | Turner | |
| 5,481,107 | A | 1/1996 | Takada et al. | |
| 5,514,868 | A | 5/1996 | Dixon | |
| 5,565,679 | A | 10/1996 | Tanner et al. | |
| 5,652,427 | A | 7/1997 | Whitehouse et al. | |
| 5,663,560 | A | 9/1997 | Sakairi et al. | |
| 5,672,868 | A | 9/1997 | Mordehai et al. | |
| 5,767,512 | A | 6/1998 | Eiden et al. | |
| 5,818,041 | A | 10/1998 | Mordehai et al. | |
| 5,939,718 | A | 8/1999 | Yamada et al. | |
| 6,028,308 | A | 2/2000 | Hager | |
| 6,093,929 | A | 7/2000 | Javahery et al. | |
| 6,140,638 | A | 10/2000 | Tanner et al. | |
| 6,191,417 | B1 * | 2/2001 | Douglas et al. | 250/282 |
| 6,222,185 | B1 | 4/2001 | Speakman et al. | |
| 6,259,091 | B1 | 7/2001 | Eiden et al. | |
| 6,340,814 | B1 | 1/2002 | Vandermey | |
| 6,348,688 | B1 | 2/2002 | Vestal | |
| 6,512,226 | B1 | 1/2003 | Loboda et al. | |
| 6,576,897 | B1 | 6/2003 | Steiner et al. | |
| 6,627,883 | B2 * | 9/2003 | Wang et al. | 250/292 |
| 6,630,665 | B2 | 10/2003 | Tanner et al. | |
| 6,700,120 | B2 | 3/2004 | Hager | |
| 6,753,523 | B1 | 6/2004 | Whitehouse | |
| 6,797,948 | B1 | 9/2004 | Wang | |
| 6,815,667 | B2 | 11/2004 | Tanner et al. | |
| 6,911,650 | B1 | 6/2005 | Park | |
| 6,992,281 | B2 | 1/2006 | Abou-Shakra et al. | |
| 7,202,470 | B1 | 4/2007 | Marriott | |
| 7,230,232 | B2 | 6/2007 | Marriott | |
| 7,339,163 | B2 | 3/2008 | Marriott | |
| 2001/0038069 | A1 * | 11/2001 | Whitehouse et al. | 250/288 |
| 2002/0079443 | A1 | 6/2002 | Krutchinsky et al. | |

FOREIGN PATENT DOCUMENTS

| | | | |
|---|---|---|---|
| EP | 0373835 | A2 | 6/1990 |
| EP | 0813228 | A1 | 12/1997 |
| EP | 0871201 | A1 | 10/1998 |
| EP | 1109198 | | 6/2001 |
| EP | 1109198 | A2 | 6/2001 |
| EP | 1114437 | | 7/2001 |
| EP | 1114437 | A1 | 7/2001 |
| EP | 0871977 | | 5/2004 |
| GB | 2301704 | | 12/1996 |
| GB | 2301704 | A | 12/1996 |
| GB | 2370686 | | 7/2002 |
| GB | 2370686 | A | 7/2002 |
| JP | 5248482 | | 9/1975 |
| JP | 5960856 | A | 4/1984 |
| JP | 62264546 | | 11/1987 |
| JP | 62264546 | A | 11/1987 |
| JP | 02158047 | | 6/1990 |
| JP | 03261062 | | 11/1991 |
| JP | 05036376 | | 2/1993 |
| JP | 05036376 | A | 2/1993 |
| JP | 09082274 | | 3/1997 |
| JP | 09082274 | A | 3/1997 |
| JP | 10097838 | | 4/1998 |
| JP | H1097838 | A | 4/1998 |
| JP | 10223174 | A | 8/1998 |
| WO | 95/23018 | A1 | 8/1995 |
| WO | WO95/23018 | | 8/1995 |
| WO | 97/07530 | A1 | 2/1997 |
| WO | 97/25737 | A1 | 7/1997 |
| WO | 97/47025 | A1 | 12/1997 |
| WO | 98/56030 | | 10/1998 |
| WO | 99/30351 | | 6/1999 |
| WO | 99/38185 | | 7/1999 |
| WO | 99/38193 | A1 | 7/1999 |
| WO | 99/62101 | A1 | 12/1999 |
| WO | 99/63578 | A2 | 12/1999 |
| WO | 01/01446 | A1 | 1/2001 |
| WO | 01/15201 | | 3/2001 |
| WO | WO01/15201 | A2 | 3/2001 |
| WO | 03/096376 | A1 | 11/2003 |

OTHER PUBLICATIONS

Akbar Montaser, "Inductively Coupled Plasma Mass Spectrometry", Wiley-VCH, 1998.

Barinaga, et al., "Ion-Molecule Reactions in an RF-Multipole . . . ", Proc. 45.sup.th ASMS Conference, Jun. 1997.

Barinaga, et al., "Ion-Trap Mass Spectrometry With An Inductively Coupled Plasma Source", Rapid Communications in Mass Spectrometry, 8:71-76, 1994, pp. 71-76.

Batey. J., "Incorporating Collision Cell Technology Into A Quadrupole ICP/MS", Presentation No. 55 at FACSS, Oct. 25, 1999 (abstract).

Brenner, I.B., "Characterization Of A New Collision Cell ICP-MS For Environmental And Geochemical Analysis", 2000 Winter Conference On Plasma Spectrochemistry, Fort Lauderdale, FL, pp. 338-339.

Brotherton,Harry, O., et al., "Determination of Drugs in Blood Serum by Mass Spectrometry/Mass Spectrometry," Anal. Chem. 1983, vol. 55, pp. 449-553.

Crain, et al., "Matrix Interferences in Inductively Coupled Plasma-Mass Spectrometry: Some Effects of Skimmer Orifice Diameter and Ion Lens Voltages", Spectrochimica Acta, 43B (9-11), 1988, pp. 1355-1364.

Dawson, P.H., et al., "The Use of Triple Quadrupoles for Sequential Mass Spectrometry," Organic Mass Spectrometry, 1982, vol. 17, No. 5, pp. 205-211.

Douglas, D.J., "Collisonal Focusing Effects in Radio Frequency Quadrupoles," American Society for Mass Spectrometry, 1992, pp. 398-408.

Douglas, D.J., "Some Current Perspectives on ICP-MS," Canadian Journal of Spectroscopy, 1988, pp. 38-49.

Douglas, et al., "Elemental Analysis with a Microwave-Induced Plasma/Quadrupole Mass Spectrometer System", Analytical Chemistry, vol. 53, No. 1, 37-41 Jan. 1981.

Du, Z., et al., "Elemental analysis with quadrupole mass filters operated in higher stability regions," J. Anal. At. Spectrom, 1999, vol. 14, pp. 1111-1119.

Eiden, et al., "Beneficial Ion/Molecule Reactions in Elemental Mass Spectrometry", Rapid Communications in Mass Spectrometry, 11:37-42, 1997, pp. 37-42.

Gluodenis, et al., "Minimizing Polyatomic Interferences in ICP/MS", Technology Spotlight, Spectroscopy Showcase, Mar. 1999.

Gut, et al., "Analysis of DNA by 'Charge Tagging' and Matrix—Assisted Laser Desorption/Ionization Mass Spectrometry", Rapid Communications in Mass Spectrometry, 11:43, 1997, p. 43 only.

Harbich, et al., "Deposition of Mass Selected Silver Clusters in Rare Gas Matrices", J. Chem. Phys. 93 (12), Dec. 1990, pp. 8535-8543.

Hausler, "Trace Element Analysis of Organic Solutions Using Inductively Coupled Plasma-Mass Spectrometry", Spectrochimica Acta, 42B (½), 1987, pp. 63-73.

Hunt, Donald, F., et al., "Mixture Analysis by Triple-Quadrupole Mass Spectrometry: Metabolic Profiling of Urinary Carboxylic Acids," Clin. Chem., 1982, vol. 28, No. 12, pp. 2387-2392.

Johnston, M., "Energy Filtering in Triple Quadrupole MS/MS," Finnigan MAT, San Jose, California, USA, No. 203, 1984.

(56) References Cited

OTHER PUBLICATIONS

King, F.L., et al., "Collision-Induced Dissociation of Polyatomic Ions in Glow Discharge Mass Spectrometry," International Journal of Mass Spectrometry and Ion Processes, 1989, vol. 89, pp. 171-185.
King, F.L., et al., "Study of Molecular Interferences in Glow Discharge Mass Spectrometry," Journal of Analytical Atomic Spectrometry, Sep. 1988, vol. 3, pp. 883-886.
McLafferty, "Tandem Mass Spectrometry," John Wiley & Sons, 1983, pp. 11-50.
Morris, Michael, et al., "Low-Energy Ion/Molecule Products from Collisions with Ammonia," Rapid Communications in Mass Spectrometry, 1993, vol. 7, pp. 1136-1140.
Nabeshima, T., et al., "Development Of Ion Trap Mass Spectrometer With Plasma Ion Source", 2000 Winter Conference On Plasma Spectrochemistry, Fort Lauderdale, FL (abstract).
Olivares, et al., "On-Line Mass Spectrometric Detection for Capillary Zone Electrophoresis," Anal. Chem., 1987, vol. 59, pp. 1230-1232.
Reimann, et al., "Graphite Surface Topography Induced by Ta Cluster Impact And Oxidative Etching", Nuclear Instruments and Methods in Physics Research B 140, 1998, pp. 159-170.
Rowan, "Collisional Removal of Molecular Ions in Inductively Coupled Plasma Mass Spectrometry", M.S. Thesis, Iowa State Univ. 1988.
Rowan, et al., "Attenuation of Polyatomic Ion Interferences in Inductively Coupled Plasma Mass Spectrometry by Gas-Phase Collisions," Applied Spectroscopy, vol. 43, No. 6, 1989, pp. 976-980.
Schwartz, Jae, C., et al., "Systematic Delineation of Scan Modes in Multidimensional Mass Spectrometry," Anal. Chem. 1990, vol. 62, pp. 1809-1818.
Search Report for British Patent Application No. GB0210930.4, dated Feb. 26, 2003, 2 pages.
Smith, Richard, D., et al., "Capillary Zone Electrophoresis—Mass Spectrometry Using an Electrospray Ionization Interface," Anal. Chem., 1988, vol. 60, pp. 436-441.
Tanner, et al., "Gas and Ion Dynamics of a Three-Aperature Vacuum Interface for Inductively Coupled Plasma-Mass Spectometry", Applied Spectroscopy, vol. 48, No. 11, 1373-1378, 1994.
VG Elemental Fisons Instruments, PlasmaQuad System Manual, pp. 2-32 through 2-38, Issue 1, 1993.
VG Elemental, PlasmaQuad System Manual, Version 2b, Jun. 1988, pp. 25-29, 1988.
Zhang, et al., "Development of an Electrostatic Ion Guide in Chemical Ionization," Review of Scientific Instruments, Nov. 1998, American Institute of Physics, vol. 69, No. 11, pp. 4002-4003.
Examination Report dated Apr. 17, 2012 in EP Application No. 10000216,1, 5 pages.
Summons to Attend Oral Proceedings dated Jan. 24, 2013 in EP Application No. 10000216,1, 7 pages.
Search Report Examination Report dated Apr. 28, 2010 in EP Application No. 10000216,1, 12 pages.
European Search Report mailed Oct. 15, 2014 in EP Patent Application No. 14175305, 7 pages.
Japanese Decision to Refuse dated Apr. 20, 2010 in Japanese Patent Application No. 504259/2004, 2 pages.
PCT Search Report prepared by the European Patent Office for PCT Application No. PCT/GB03/02041, mailed Aug. 29, 2003, 3 pages.
Summary of Notice of Grounds for Rejection dated Jan. 6, 2009 in Japanese Patent Application No. 504259/2004, 3 pages.
PCT Search Report (Forms PCT/ISA/210) prepared by the European Patent Office for PCT Application No. PCT/GB03/02041, 4 pages.
Combined Search and Examination Report for British Patent Application No. GB0311003.8 dated Jul. 1, 2003 (5 pages).

* cited by examiner

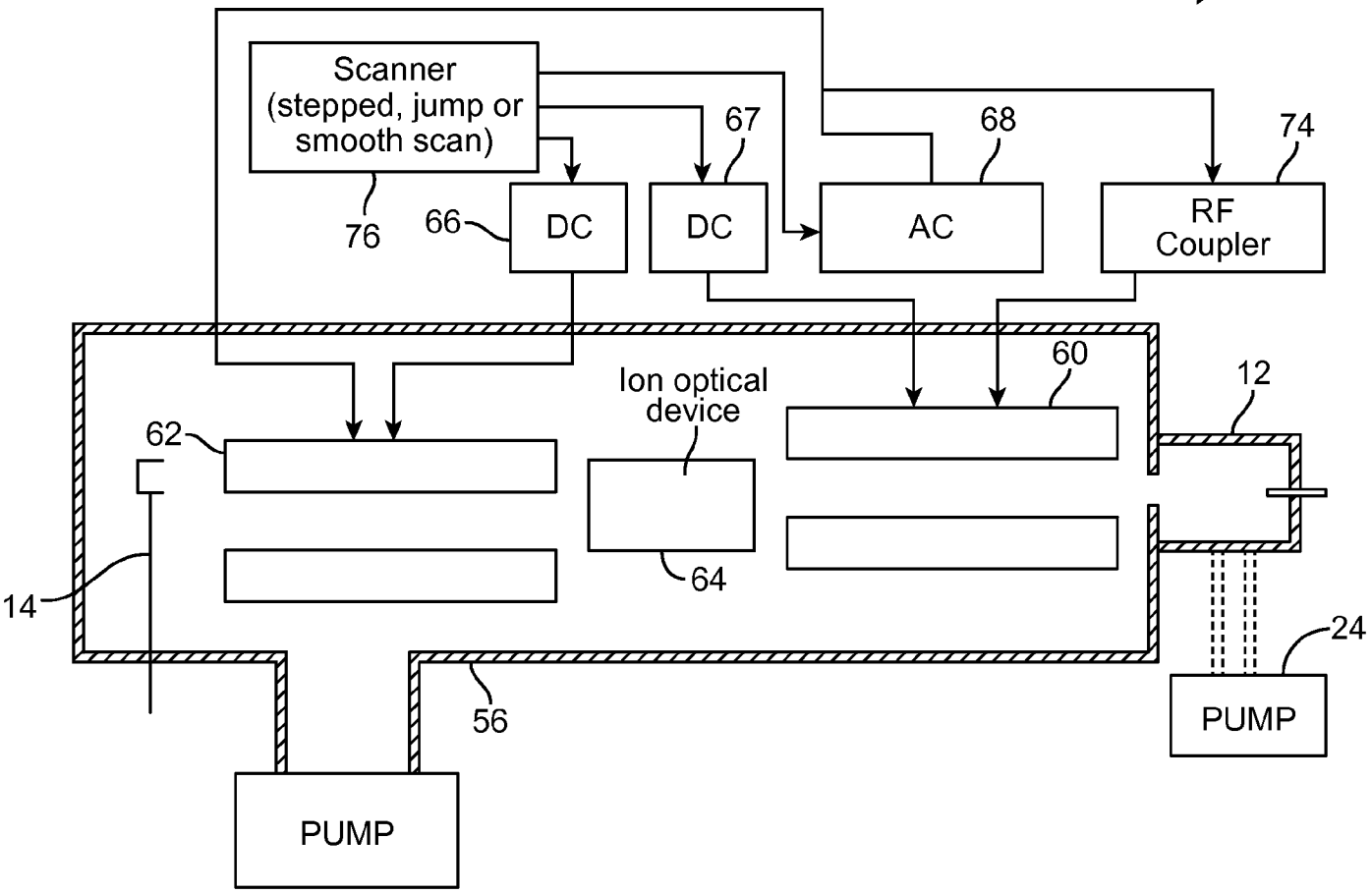
FIG. 3
New

MASS SPECTROMETER AND MASS FILTERS THEREFOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIOR APPLICATIONS

This application claims benefit of Patent Cooperation Treaty Application Number PCT/GB03/02041, filed May 13, 2003, which claims priority from Great Britain Application Number 0210930.4, filed May 13, 2002.

TECHNICAL FIELD

This invention relates to a method and apparatus for improving operational characteristics of mass spectrometers.

The invention is described herein with reference to quadrupole mass filter arrangements, but is not limited to such apparatus.

BACKGROUND

Quadrupole, or multipole mass filters are known in the mass spectroscopy art and operate to transmit ions having a mass/charge ratio which lie within a stable operating region. The size of the stable operating region is governed by the geometry of quadrupole rods, and the magnitudes of DC and RF voltages (including the RF voltage's frequency) applied to the rods, amongst other factors. Thus, the transmitted ions can have a range of mass/charge ratios depending on the size of the stable operating region. The transmission characteristics of the filter, and hence the range of mass/charge ratios within the transmitted, or filtered ion beam, can be reduced by reducing the stable operating region's size. Rejected ions are not transmitted to the spectrometer's output or detector.

A substantial proportion of the rejected ions strike the quadrupole rods sputtering material from, and/or depositing dielectric material onto the rods. A large amount of deposition can occur over time, particularly when a spectrometer is used to analyse masses of particles within relatively intense ion beams. Deposited material can result in areas of the rod's surface becoming partially or completely insulating, or having a different electrical work function. Thus, the material deposited on the rods affects the characteristics of the electric field associated with the voltages applied to the rods. Ultimately, the deposited material changes the electric field strength near the surface of the rods.

A further problem, known as the space charge effect, occurs when analysing relatively intense ion beams. As the intense ion beam enters the quadrupole mass filter the electric field associated with the voltages applied to the quadrupole rods is distorted. This distortion of the field is due to the presence of the charged particles in the ion beam. The electric field distortions occur in the vicinity of the ions in the beam.

Quadrupole mass filters are seriously affected by these problems, particularly when a spectrometer comprising such filters operates at a high mass resolution. Very onerous demands on the precision with which the electric field is maintained are required for high resolution mass spectrometry. Furthermore, at high resolving powers, the stable trajectories of ions through the filter pass very close to the rods for relatively long distances in the filter. Therefore, the trajectories pass very close to the deposited dielectric material, and hence within a region of the electric field suffering from distortions.

Also, the resolving power of a spectrometer is approximately proportional to the square of time spent in the filter by the ions. Thus, a desired resolution may only be achieved if the ions spend sufficient time in the filter; the longer the ions spend in the filter, the greater the resolution obtained. It is usual to decelerate the ions to very low energies (typically 2 ev) to maximise time spent in the filter, and hence increase resolving power of the spectrometer. The space charge effect is high for such a slow ion beam, and this exacerbates the problems associated with distorted electrical fields caused by the space charge effect. Thus, presently there is a compromise between the space charge effect, ion beam energy and spectrometer mass resolution.

A mass filter having a distorted electric field caused by the problems described above can have a considerably reduced mass resolving power or transmission. In the worst case, the spectrometer is rendered useless. The problems are exacerbated over time as more dielectric material is deposited on the rods. The accumulation of material tends to be uneven with more material deposited close to the entrance of the filter since most ions are rejected on entry into the filter. When the spectrometer's performance falls below a tolerable level it is necessary to replace or refurbish the mass filter at considerable cost.

U.S. Pat. No. 3,129,327 discloses auxiliary electrode rods which are driven only by AC voltages to improve transmission into a second set of rods which act as a mass filter; the auxiliary electrodes act as an ion guide.

U.S. Pat. No. 4,963,736 discloses a rod set operating with substantially no DC voltage and at an elevated pressure. Thus, the filter act as a pressurised ion guide which has high transmission properties due to collision focussing.

U.S. Pat. No. 6,140,638 discloses a mass filter comprising a first filter operating as a collision/reaction cell and at an elevated gas pressure with respect to a second filter. The apparatus disclosed aims to reduce isobaric interferences by transmitting ions through a collision cell to reject intermediate ions which would otherwise cause isobaric interferences.

U.S. Pat. No. 6,340,814 discloses a spectrometer comprising two filters operating with similar mass resolution to improve the resolution of the whole device. When the two filters are coupled to one another, a higher resolution is achieved compared to the resolving power of each filter separately.

EP1114437 discloses a method and apparatus for removing ions from an ion beam to reduce the gas load on the collision cell which serves to minimise the formation, or reformation, of unwanted artefact ions in the collision cell.

None of these systems propose a solution to the problems described above.

SUMMARY OF THE INVENTION

It is an aim of the present invention to ameliorate the problems associated with the prior art. In their broadest form, embodiments of the invention reside in a mass spectrometer which comprises a multiple mass filter stage. In one of the mass filters a large proportion of unwanted ions are removed from the ion beam.

More precisely, there is provided a mass filter apparatus for filtering a beam of ions having mass/charge ratios in a range of mass/charge ratios to transmit ions of a selected mass/charge ratio in the said range, comprising an ion beam source for emitting the ion beam, first and second mass filter stages in series to receive the beam from the beam source, and a vacuum system for maintaining at least the second filter stage at an operating pressure below $10^{-3}$ torr, wherein said vacuum system is arranged to maintain both the first and second filter stages at operating pressures below $10^{-3}$ torr, the first mass filter stage is arranged for transmitting only ions having a sub-range of mass/charge ratios which includes the selected mass/charge ratio, and the second mass filter is arranged for transmitting only ions of the said selected mass/charge ratio.

Also, there is provided a method for filtering a beam of ions having mass/charge ratios within a range of mass/charge ratios to transmit ions of a selected mass/charge ratio in the said range, the method comprising; emitting the ion beam from a beam source into a first mass filter stage; transmitting through the first mass filter stage only ions having a sub-range of mass/charge ratios which includes the selected mass/charge ratio; and transmitting through a second mass filter stage in series with the first mass filter only ions having the selected mass/charge ratio, wherein the first and second filter stages operate at pressures below $10^{-3}$ torr.

Furthermore, there is provided a method for filtering ions with a given mass/charge ratio from a beam of ions having an array of mass/charge ratios, in a mass spectrometer comprising an ion beam source for emitting the ion beam, a detector or output for detecting or transmitting the filtered ions, and a plurality of mass filters disposed in series between the beam source and the detector or output, the filters having the same operating pressures at or below $10^{-3}$ torr, the method comprising; emitting the ion beam from a beam source into a first mass filter, transmitting only ions having a range of mass/charge ratios which includes the mass/charge ratio of the filtered ions from a first mass filter, and transmitting only the filtered ions from a second mass filter, disposed between the first mass filter and the detector or output.

Yet further, there is provided a method for producing a mass spectrum of a beam ions having mass/charge ratios within a range of mass/charge ratios, comprising; emitting the ion beam from a beam source into a first mass filter stage, transmitting only ions having a sub-range of mass/charge ratios which includes a selected mass/charge ratio through the first mass filter, transmitting only ions having the selected mass/charge ratio through a second mass filter in series with the first mass filter to a detector for detecting any ions having the selected mass/charge ratio, controlling at least the second filter stage so that the mass/charge ratio of transmitted ions is scanned over a scanned range, and detecting the number of ions transmitted by the second filter stage at any given mass/charge ratio to provide a mass spectrum, wherein the first and second filter stages operate at pressures below $10^{-3}$ torr.

Yet still further, there is provided a method of improving the resolving power of a mass spectrometer, comprising; emitting an ion beam from a beam source into a first and second mass filter stages in series, the ions in the beam having mass/charge ratios within a range of mass/charge ratios; transmitting through the first mass filter stage only ions having a sub-range of mass/charge ratios which includes a selected mass/charge ratio; receiving only ions in said sub-range at the second filter stage; transmitting through a second mass filter stage only ions having the selected mass/charge ratio, whereby the second filter stage can operate with reduced ion beam current.

Further still, there is provided a method for reducing the deposition of material on multipole elements of a primary resolving filter of a mass spectrometer, comprising emitting an ion beam from a beam source into a first mass filter stage, the ions in the beam having mass/charge ratios within a range of mass/charge ratios, transmitting through the first mass filter stage only ions having a sub-range of mass/charge ratios which includes a selected mass/charge ratio, receiving only ions in said sub-range at a second filter stage in series with said first filter stage, said second filter stage constituting said primary resolving filter, and transmitting through the second filter stage only ions having a selected mass/charge ratio within the sub-range, thereby reducing the number of ions rejected in said primary resolving filter.

Embodiments of the present invention have an advantage of operating with high resolution over much longer periods, compared to previous systems. A coarse filter removes the majority of unwanted ions from the ion beam and is arranged to operate with a relatively high band pass compared with a fine filter. Thus, the problems described above associated with the prior art can be reduced for the filters and the accuracy of the filter can be improved.

The operational procedures for an apparatus or method embodying the invention can be greatly simplified with respect to devices that utilise collision or reaction cells in the filter stages of the spectrometer. The only gases likely to be present in the filters of the devices embodying the present invention are very low level traces of residual gases such water vapour, $CO_2$, or Ar which are mostly derived from the ion source, residue in the filter or purge gas. Traces of these gases at partial pressures below $10^{-3}$ torr in a typical filter are insufficient to cause any significant number of reactions with the ions being passing through the filter.

Devices and methods embodying the invention also have the advantage of less problematic operation, especially at high resolving powers, and when compared to spectrometers comprising collision or reaction cells. The spectrum produced by devices utilising collision or reaction cells can include unwanted peaks derived from reacted ions. The transmission of ions through the reaction/collision cell is reduced by the collisions or reactions, and so the sensitivity of the device is affected. The complexity to such device's operation is high because of the controls necessary for operating the reaction/collision cells. Also, a high degree of knowledge in ion collision chemistry is required by the operator to ensure the correct gas is used, otherwise the required reactions does not occur and the spectral results can be misleading or useless. Embodiments of the present invention operate at pressures where reactions or collisions are very unlikely to occur in the filter stage.

As described above the filters operate at a high vacuum of $10^{-3}$ torr, or less, at which pressures the density of gas molecules in the filter is at such a level that the likelihood of reactions or collisions taking place between the ions in the beam and any residual gas in the filter is very low or none existent. This has a further advantage that high transmission coefficients through the filters for the desirable ions can be achieved (and hence improvements to the sensitivity of the spectrometer is also improved).

Such advantages are particularly desirable for high resolution mass spectrometers. Such systems might typically operate at $10^{-6}$ torr, at which pressure, if there are any collisions and/or reactions of ions with the gas in the filter they have virtually no affect on the ion beam intensity or resulting spectrums. Thus, advantageously, embodiments of the present invention can operate at extremely high resolving powers and high beam intensities.

Also, a single vacuum pump can be used to maintain the vacuum in all filter stages, thus further simplifying the system.

Another advantage is achieved by removing a majority of ions from the ion beam in the first filter stage, and hence reducing the beam current in the second filter stage. Thus, the amount of material deposited on the second filter stage's elements is greatly reduced, allowing the second filter stage to operate with very high resolving powers for much longer periods of time. The time between service intervals can therefore be increased, increasing the time in which the spectrometer is operational and reducing costs. The second filter stage can also operate at very high resolving powers since the electric field characteristics in the filter remain substantially constant because of the much reduced deposition of dielectric material in the filter. The space charge effect can be calculated with a high degree of accuracy and compensated for. The space charge effect is much lower due to reduced beam current, thus further improving the resolving powers of the device.

DESCRIPTION OF THE DRAWINGS AND PREFERRED EMBODIMENTS

Embodiments of the present invention are now described, by way of example and with reference to the accompanying drawings, in which:

*FIG. 3 shows a schematic representation of other embodiments of the present invention.*

Figure 1:
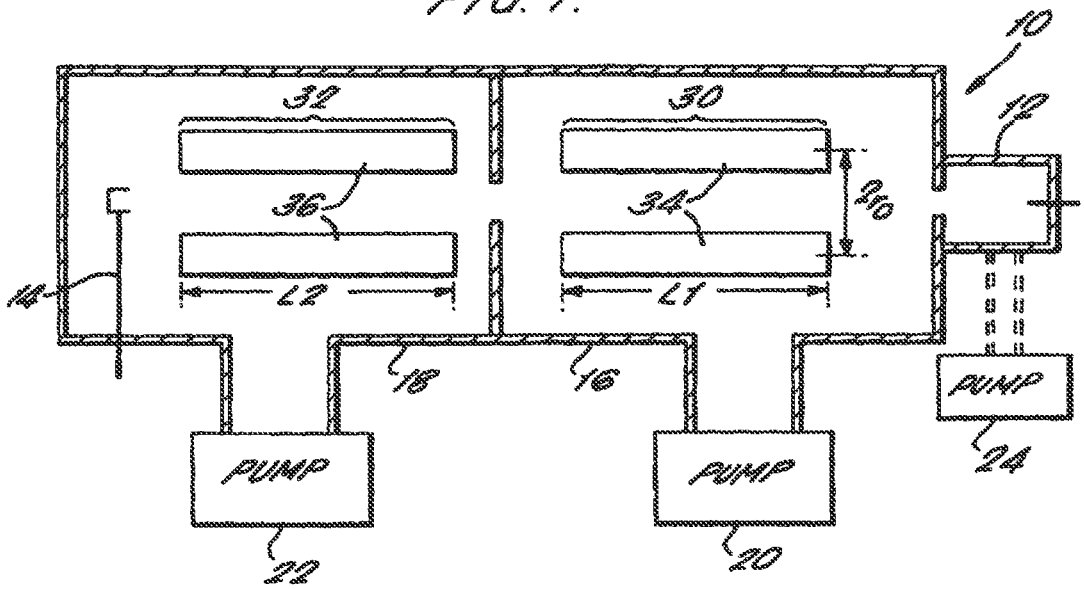
FIG. 1 is a highly schematic representation of an embodiment of the present invention.

Referring to FIG. 1, a mass spectrometer 10 embodying the present invention is shown. The spectrometer comprises an ion beam source 12 and a detector 14. Disposed between the ion source and the detector are two vacuum chambers 16 and 18 respectively. Each chamber is maintained at a high level of vacuum by vacuum pumps 20 and 22 respectively. Vacuum pump 24 is used to evacuate the ion beam source beam chamber 12, if required. Mass filters 30 and 32 are each disposed in chambers 16 and 18 respectively. The filters are disposed in series relative to one another and the ion beam source. Thus, the ion beam passes first through one filter and then the other before striking the detector, or being emitting from an output (not shown). Quadrupole rods 34 and 36 are arranged to influence the ions in the ion beam passing through the mass filters 30 and 32 respectively.

For the purpose of this description, the filter 30 closest to the beam source chamber 12 is termed a "sacrificial filter". The filter 32 closest to the detector 14 is termed the "analysis filter".

The sacrificial filter operates at a lower resolving power and provides a more broad stability region than the analysis filter. The stability region of the sacrificial filter is set so that most of the mass spectrum of ions entering the filter is rejected. Put another way, the sacrificial filter acts to pre-filter the beam before it enters the analysis filter.

A high proportion of rejected ions strike the quadrupole rods of the sacrificial filter causing deposition thereon, but because the filter has a relatively broad stability region, any distortions of the electric field caused by such deposits in the filter 30 do not cause rejection of ions of the required mass/charge ratio. Thus, a large amount of unwanted material is removed from the ion beam before it enters the analysis filter, whilst substantially all ions of the required mass/charge ratio are transmitted to the analysis filter.

In addition, the high intensity ion beam entering the sacrificial filter 30 can distort the electric field by the space charge effect. The broad stability region of the sacrificial filter continues to operate so that substantial all the ions of the required mass/charge ratio are transmitted to the analysis filter. However, advantageously, the space charge effect in the analysis filter 32 is greatly reduced due to the reduced ion beam intensity or ion current, the majority of ions in the beam having been rejected in the sacrificial filter.

Furthermore, the sacrificial filter can operate at higher ion Energies, relative to the analysis filter. The ions can be decelerated before entering the analysis filter to roughly ⅕ the energy with which they transit the sacrificial filter. The sacrificial filter can be arranged to remove most of the unwanted ion beam current at the increased beam energy.

Also, the transmission of ions through the sacrificial filter is relatively high because of the high ion energy. In a preferred embodiment, the sacrificial filter typically removes 99.9% of the ion current. Put another way, 0.1% of ions in the ion beam are transmitted by the sacrificial filter. More preferably the sacrificial filter operates with a 0.01% transmission factor for very high resolution applications. As a result, the space charge effect and deposition of unwanted material on the analysis filter is reduced by a factor, in the order of 99.99%. Embodiments of the invention are particular effective where ion currents of 100 nA or more are present and when a resolution of 0.1 atomic mass units (amu) is required. At very high resolution (that is in the order of 0.02 amu) embodiments of the invention are extremely effectual.

The analysis filter is set to operate with sufficient resolving powers for each application. This resolution might typically be between 1 amu to fractions of an amu across the mass/charge ratio range chosen. The width of the analysis filter's band pass determines the resolution of the mass spectrometer.

Figure 2:
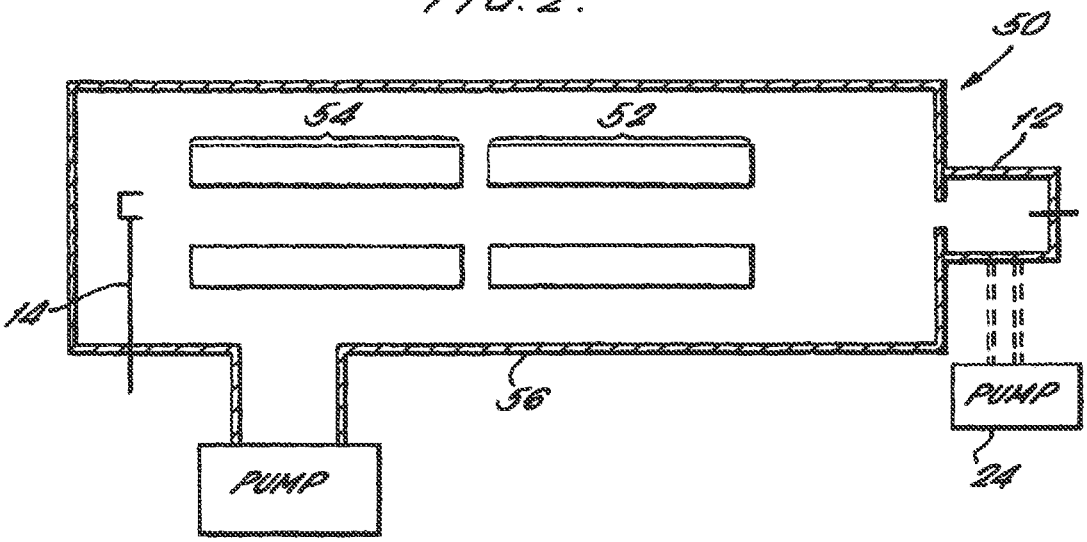
FIG. 2 is a highly schematic representation of another embodiment of the present invention.

With reference to FIG. 2, a second embodiment is shown. Here, the mass spectrometer 50 also comprises an ion beam source 12 and source vacuum pump 24, if required. However, in this embodiment the sacrificial mass filter 52 is close coupled to the analysis mass filter 54. Thus, both filters are disposed in a single vacuum chamber 56. This arrangement provides improved transmission in comparison with the first embodiment shown in FIG. 1, where the sacrificial filter is separated from the analysis filter.

Further embodiments of the apparatus might include additional filters, or the like, within the vacuum chamber system. These additional components might be particularly useful if MS—MS experiments are being performed. Furthermore, additional multi-pole structures may be incorporated in the instrument comprising collision/reaction cells or ion guides. Auxiliary electrodes driven by AC voltages only may also be included to improve transmission. It may be desirable to locate these additional components between the sacrificial and analysis filters.

Other multipole arrangements, besides quadrupoles, can be used to filter ions outside a mass/charge ratio from the ion beam and preferably the analysis and sacrificial filters have the same rod configuration, but not necessarily rod length. If resolving powers below 1 amu are required, it is preferable to configure the rods in a quadrupole arrangement.

The opposing rods of the filters (in a quadrupole configuration) are spaced apart by a distance 2 $r_0$. Preferably, $r_0$ for both the sacrificial and analysis filters are equal and between 1 mm and 15 mm, or more preferably between 4 mm and 8 mm. The length of the sacrificial filter rods, L1, should be between 1 and 80 times $r_0$, but preferably between 2 to 6 times $r_0$. The analysis filter rod length, L2, is preferably between 20 to 80 times $r_0$. For high resolution applications there can be a compromise between the rod length (to maximise the time ions spend in the filter) and engineering tolerances that constrain how long rods can be made to a given accuracy. At the priority date of this application an optimum length for L2 is 250 mm, where $r_0$=6 mm. Filter rod manufacturing methods may improve with time, and the upper limit of 80 $r_0$ for the rod length should not be limiting.

Typically, the chamber length containing the sacrificial filter need only be a few percent longer than the filter rods, although it can be longer to accommodate additional components.

Preferably the DC bias (pole bias) applied to all the rods in the sacrificial filter is controlled independently to the pole bias of the analysis filter rods. In this way, the kinetic energy of the ions in each filter can be controlled independently, for the reasons previously described.

Also, it is preferable to connect the sacrificial filter (*e.g., filter 60, as shown in FIG. 3*), via an RF coupler (*e.g., RF coupler 74, as shown in FIG. 3*) such as capacitors, to the analysis filter's power supply (*e.g., AC power supply 68*). Thus, the sacrificial filter has the same RF voltage (*also referred to as AC voltage*) as the analysis filter (*e.g., filter 62*) thereby reducing the need for additional power supplies, and hence reducing the overall cost of the instrument. In this preferred embodiment, the sacrificial filter has a different DC potential applied, *e.g., by DC power supply 67,* to the rods compared to the analysis filter DC potential, *e.g., applied by DC power supply 66,* since the sacrificial filter operates at a different resolution. In the case of the sacrificial filter, the DC potentials require relatively low precision since they are applied to a low resolution mass filter.

Filter resolution can be controlled by varying the RF to DC voltage ratio. For very high resolution the RF:DC ratio should lie between −5.963 and −5.958. The ratio for the sacrificial filter should lie between −5.983 to −6.00. (The voltages are calculated using known equations, such as equation 2.19 and 2.20 in "Quadrupole Mass Spectrometry and its Applications", by P H Dawson, published by Elsevier, 1976, for example, assuming the ions transmitted have an amu=115, $r_0$=6.0 mm, $V_{RF}$=−1205.44V, $V_{DC}$=202.24V, and RF drive frequency=2.0 MHz, given an RF:DC ratio of −5.96).

The filter chambers preferably operate at the same pressure and below $10^{-3}$ mbar, and more preferably below $10^{-5}$ mbar.

In another embodiment, an auxiliary rod system, similar to the system disclosed in U.S. Pat, No. 3,129,327 may be utilised to improve transmission into the sacrificial filter.

Embodiments of this invention are distinguished from other systems since the sacrificial filter transmits ions having substantially the same mass/charge ratio as those transmitted by the analysis filter. Other devices have been previously proposed to operate by selecting a parent ion in the first filter and where daughter ions of a different mass/charge ratio are transmitted by the second filter.

In the preferred embodiments the analysis filter determines the resolving power of the spectrometer. A spectrum of the ion beam can be produced by scanning the band pass of the filters through the desired range of mass/charge ratios. It is preferable to scan both filters at the same time to produce the spectrum. The scan can be a smooth scan through a range of mass/charge ratios or a jump scan where both the filter's transmission characteristics are stepped from one transmission peak to another. The jump scan can be particularly useful if areas of the spectrum are of no interest to the end-user.

Since both filter's transmission profiles are likely to be non-uniform (that is, the transmission does not have a 'top-hat' like profile) it is important to scan both the sacrificial and analysis filter together. In this way, any substantial modulation of the spectrum can be minimised. In a preferred embodiment, the filter's transmission profiles are scanned across the desired range of mass/charge ratios by scanning the power supply to the filters.

The RF:DC ratio determines the band pass width of the mass filters and so the analysis filter has a different RF:DC ratio applied compared to the sacrificial filter. A change to the rod voltage amplitude changes the mass/charge ratios transmitted through the filter. So, to achieve a scan through a mass/charge range, the analysis filter's supply is increased in amplitude, but the RF:DC ratio remains constant throughout the amplitude increase. If the sacrificial filter's RF supply is coupled to the analysis filter (as described above), then the RF signal strength on the sacrificial filter is also modulated. Thus, the sacrificial filter's separate DC supply should be modulated to scan the sacrificial filter through the mass/charge range whilst keeping its RF:DC constant. The sacrificial filter's DC supply is ramped up using a separate scanner device, *e.g., scanner 76 in FIG. 3*, since the sacrificial filter has a separate DC supply in the preferred embodiment. In this way, both the filter's transmission characteristics are scanned through the mass/charge range of interest without moving relative to one another (that is, the rate at which the filters are scanned over the mass/charge ratio is substantially the same for both filters).

If the filter transmission profiles are known, it may be desirable to scan the analysis filter only through the range transmitted by the sacrificial filter, particularly if the spectrum range is within the band pass of the sacrificial filter. However, a compensation factor should be added to the detected spectrum to compensate for the uneven transmission profile. If the spectral range is broader than the sacrificial filter's band pass, then both filters may have to be scanned. In which case, the sacrificial filter can be scanned coarsely whilst the analysis filter is scanned finely to produce the spectrum.

The detector and scan controller are preferably computer controlled, thereby allowing the capture of the spectrum to be automated. Suitable detectors and scan controlling means are known in the art.

Although FIGS. 1 and 2 show the filters on a common axis, it may be desirable to arrange the analysis filter [pff-axis] *off-axis* to the sacrificial filter, *as shown in FIG. 3*. As a result, there would be no line-of-sight path from the sacrificial filter to the detector, through the analysis filter. This has the advantage of reducing the background count rate of the detector. Such a background count may be as a result of neutral species passing through the filter system. Of course, the skilled person appreciates that neutral species are not affected by the filters quadrupole field and thus pass straight through the filter. There are several ways to displace the axis of the sacrificial and analysis filter from one another including disposing a different ion optical device (*e.g., ion optical device 64 in FIG. 3*) between the two filters. An alternative arrangement would be to arrange the axis of the sacrificial filter so that it intersects the axis of the analysis filter at an angle to, and substantially at the entrance of, the analysis filter stage.

Further embodiments within the scope of the invention will be envisaged by the skilled person. For example, it may be desirable to have two or more analysis or sacrificial filters to further improve performance characteristics of a mass spectrometer. Also, other components might be disposed in series and between the sacrificial filter and the analysis filter; the two mass filters do not have to be juxtaposed. Of course, this invention is not limited to quadrupole mass filter configurations. Other configurations of filter can be used in embodiments within the scope of this invention.

What is claimed is:

1. Mass filter apparatus for filtering a beam of ions having mass/charge ratios in a range of mass/charge ratios to transmit ions of a selected mass/charge ratio in [the] said range, comprising:

an ion beam source for emitting the ion beam, first and second mass filter stages in series to receive the beam from the beam source, and a vacuum system arranged to maintain both the first and second filter stages at operating pressures below $10^{-3}$ torr, wherein the first mass filter stage is configured to select for transmission on to the second filter stage only ions having a sub-range of mass/charge ratios which includes the selected mass/charge ratio, and the second mass filter stage is configured to select only ions of [the] said selected mass/charge ratio.

2. An apparatus according to claim 1, wherein the ions within the sub-range comprise 1%, or less, of the ions within the beam.

3. An apparatus according to claim 1, wherein the ions within the sub-range comprise 0.01%, or less, of the ions within the beam.

4. An apparatus according to claim 1, wherein each filter stage comprises a multi-pole [analyser] *analyzer*.

5. An apparatus according to claim 4, wherein each filter stage comprises rods in a quadrupole arrangement.

6. An apparatus according to claim 4, further comprising a DC *voltage supply* and *an* AC voltage supply for applying [a] driver [voltage] *voltages* to [the] rods of each filter stage.

7. An apparatus according to claim 4, wherein an AC voltage supply is connected to one of the filter stages and another filter stage is electrically coupled to the one filter stage by an [RE] *RF* coupler.

8. An apparatus according to claim 1, further comprising a scanner for controlling [at least] the second filter stage so that the mass/charge ratio of transmitted ions is scanned over a scanned range to provide a mass spectrum.

9. An apparatus according to claim 8, wherein the scanner is arranged to control also the first filter stage so that a [centre] *center* point of the sub-range of mass/charge ratios transmitted by said first filter stage substantially tracks the scanned mass/charge ratio transmitted by the second filter stage.

10. An apparatus according to claim 1, wherein the first filter stage is arranged off axis with respect to the second filter stage.

11. An apparatus according to claim 10, wherein the longitudinal axis of the first filter stage is arranged to intersect with the longitudinal axis of the second filter stage substantially at the end of the second filter stage nearest to the first filter stage.

12. Mass spectrometer comprising a mass filter apparatus according to claim 1.

13. A method for filtering a beam of ions having mass/charge ratios within a range of mass/charge ratios to transmit ions of a selected mass/charge ratio in [the] said range, the method comprising:

emitting the ion beam from a beam source into a first mass filter stage that is arranged in series with a second mass filter stage;

selecting at the first mass filter stage for transmission on to the second mass filter stage only ions having a sub-range of mass/charge ratios which includes the selected mass/charge ratio; and selecting at the second mass filter stage only ions having the selected mass/charge ratio, wherein the first and second filter stages operate at pressures below $10^{-3}$ torr.

14. A method according to claim 13, wherein the ions within the sub-range comprise 1%, or less, of the ions within the beam.

15. A method according to claim 13, wherein the ions within the sub-range comprise 0.01%, or less, of the ions within the beam.

16. A method according to claim 13, wherein each filter stage comprises a multi-pole mass filter, and [a] DC and AC driver [voltage is] *voltages are* applied to the filter.

17. A method according to claim 16, wherein an AC voltage is supplied to one filter stage and another filter stage is electrically coupled to the first filter stage by an RF coupler.

18. A method for producing a mass spectrum of an ion beam having mass/charge ratios within a range of mass/charge ratios, comprising:

emitting the ion beam from a beam source into a first mass filter stage, selecting only ions having a sub-range of mass/charge ratios which includes a selected mass/charge ratio at the first mass filter stage for transmission on to a second mass filter stage arranged in series with the first mass filter stage, selecting only ions having the selected mass/charge ratio at the second mass filter stage for transmission on to a detector for detecting any ions having the selected mass/charge ratio, controlling [at least] the second filter stage so that the selected mass/charge ratio is scanned over a scanned range, and detecting the number of ions selected by the second filter stage at any given mass/charge ratio to provide a mass spectrum, wherein the first and second filter stages operate at pressures below $10^{-3}$ torr.

19. A method according to claim 18, further comprising controlling the mass/charge of ions selected by the first filter stage so that a [centre] *center* point of the sub-range of mass/charge ratios selected by said first filter stage substantially tracks the selected mass/charge ratio during scanning of the selected mass/charge ratio by the second filter stage.

20. A method according to claim 18, wherein the ions within the sub-range comprise 1%, or less, of the ions within the beam.

21. A method according to claim 18, wherein the ions within the sub-range comprise 0.0 1%, or less, of the ions within the beam.

22. A method according to claim 18, wherein each filter stage comprises a multi-pole mass filter, and [a] DC and AC driver [voltage is] *voltages are* applied to the filter.

23. A method according to claim 22, wherein [an] *the* AC voltage is supplied to one filter stage, and *wherein* another filter stage is electrically coupled to the first filter stage by an [RE] *RF* coupler.

24. A method according to claim 22, wherein a scanner controls *amplitudes of* the AC and DC [voltage amplitudes] *voltages* over a voltage range, and the AC:DC voltage ratio [constant] is kept substantially constant.

25. A method for filtering ions with a given mass/charge ratio from a beam of ions having an array of mass/charge ratios, in a mass spectrometer comprising an ion beam source for emitting the ion beam, a detector or output for detecting or transmitting the filtered ions, and a plurality of mass filters disposed in series between the beam source and the detector or output, the filters having the same operating pressures at or below $10^{-3}$ torr, the method comprising:

emitting the ion beam from a beam source into a first mass filter, selecting at the first mass filter for transmission on to a second mass filter only ions having a range of mass/charge ratios which includes the mass/charge ratio of the filtered ions, *the range being broader than the mass/charge ratio and narrower than the array of mass/charge ratios of the ion beam*, and selecting at the second mass filter for transmission on to the detector or output only the filtered ions, the second mass filter being disposed between the first mass filter and the detector or output.

26. A method according to claim 25, wherein the ions within the [sub-range] *range* comprise 1%, or less, of the ions within the beam.

27. A method according to claim 25, wherein the ions within the [sub-range] *range* comprise 0.01%, or less, of the ions within the beam.

28. A method of improving the resolving power of a mass spectrometer, comprising:

emitting an ion beam from a beam source into a first mass filter stage that is in series with a second mass filter stage, the ions in the beam having mass/charge ratios within a range of mass/charge ratios;

selecting at the first mass filter stage only ions having a sub-range of mass/charge ratios which includes a selected mass/charge ratio, *the range being broader than the sub-range, the sub-range being broader than the selected mass/charge ratio*;

receiving only ions in said sub-range at the second mass filter stage;

selecting at the second mass filter stage only ions having the selected mass/charge ratio, whereby the second filter stage can operate with reduced ion beam current.

29. A method according to claim 28, wherein the ions within the sub-range comprise 1%, or less, of the ions within the beam.

30. A method according to claim 28, wherein the ions within the sub-range comprise 0.01%, or less, of the ions within the beam.

31. A method according to claim 28, wherein the first and second filter stages operate at pressures below $10^{-3}$ torr.

32. A method for reducing the deposition of material on multipole elements of a primary resolving filter of a mass spectrometer, comprising:

emitting an ion beam from a beam source into a first mass filter stage, the ions in the beam having mass/charge ratios within a range of mass/charge ratios, selecting at the first mass filter stage only ions having a sub-range of mass/charge ratios which includes a selected mass/charge ratio, receiving only ions in said sub-range at a second mass filter stage in series with said first mass filter stage, said second mass filter stage constituting said primary resolving filter, and selecting at the second mass filter stage only ions having a selected mass/charge ratio within the sub-range, thereby reducing the number of ions rejected in said primary resolving filter.

33. A method according to claim 32, wherein the ions within the sub-range comprise 1%, or less, of the ions within the beam.

34. A method according to claim 32, wherein the ions within the sub-range comprise 0.01%, or less, of the ions within the beam.

35. A method according to claim 32, wherein the first and second filter stages operate at pressures below $10^{-3}$ torr.

*36. An apparatus according to claim 1, wherein each filter stage comprises:*

*a multi-pole mass filter having a DC voltage and an RF voltage applied to the multi-pole mass filter, wherein an RF:DC ratio determines a band pass width of the multi-pole mass filter, the band pass width of the first filter stage being broader than the band pass width of the second filter stage.*

*37. An apparatus according to claim 1, wherein both the first and second mass filter stages are configured to operate in a same stable operating region.*

*38. An apparatus according to claim 1, further comprising a scanner configured to scan the first filter stage and the second filter stage together to provide a mass spectrum.*

*39. An apparatus according to claim 38, wherein the scan is stepped from one transmission peak to another.*

*40. An apparatus according to claim 38, wherein the scan is a smooth scan.*

*41. An apparatus according to claim 8, wherein the scanned range is the sub-range.*

*42. A method according to claim 13, further comprising:*

*operating the first and second mass filters stages in a same stable operating region.*

*43. A method according to claim 13, further comprising:*

*scanning the first mass filter stage and the second mass filter stage together to provide a mass spectrum.*

*44. A method according to claim 43, wherein the scan is a jump scan.*

*45. A method according to claim 43, wherein the scan is a smooth scan.*

*46. A method according to claim 13, further comprising:*

*scanning the second mass filter stage over a scanned range to provide a mass spectrum, wherein the scanned range is the sub-range.*

*47. A method according to claim 18, further comprising:*

*operating the first and second mass filters stages in a same stable operating region.*

*48. A method according to claim 18, wherein the first mass filter stage and the second mass filter stage are scanned together to provide the mass spectrum.*

*49. A method according to claim 48, wherein the scan is a jump scan.*

*50. A method according to claim 48, wherein the scan is a smooth scan.*

*51. A method according to claim 18, wherein the scanned range is the sub-range.*

*52. A method according to claim 25, further comprising:*

*operating the first and second mass filters stages in a same stable operating region.*

*53. A method according to claim 25, further comprising:*

*scanning the first mass filter and the second mass filter together to provide a mass spectrum.*

*54. A method according to claim 53, wherein the scan is stepped from one transmission peak to another.*

*55. A method according to claim 53, wherein the scan is a smooth scan.*

*56. A method according to claim 25, further comprising:*

*scanning the second mass filter over a scanned range to provide a mass spectrum, wherein the scanned range is the range.*

*57. A method according to claim 28, further comprising:*

*operating the first and second mass filters stages in a same stable operating region.*

*58. A method according to claim 28, further comprising:*

*scanning the first mass filter stage and the second mass filter stage together to provide a mass spectrum.*

*59. A method according to claim 58, wherein the scan is a jump scan.*

*60. A method according to claim 58, wherein the scan is a smooth scan.*

*61. A method according to claim 28, further comprising:*

*scanning the second mass filter stage over a scanned range to provide a mass spectrum, wherein the scanned range is the sub-range.*

*62. The method of claim 32, further comprising:*

*operating the first and second mass filters stages in a same stable operating region.*

*63. The method of claim 32, wherein the first mass filter stage and the second mass filter stage are scanned together to provide a mass spectrum.*

*64. The method of claim 63, wherein the scan is stepped from one transmission peak to another.*

*65. The method of claim 63, wherein the scan is a smooth scan.*

*66. The method of claim 32, further comprising:*

*scanning the second mass filter stage over a scanned range to provide a mass spectrum, wherein the scanned range is the sub-range.*

* * * * *